(No Model.) 6 Sheets—Sheet 1.
R. YOAKUM.
FISH HARVESTER.
No. 450,306. Patented Apr. 14, 1891.
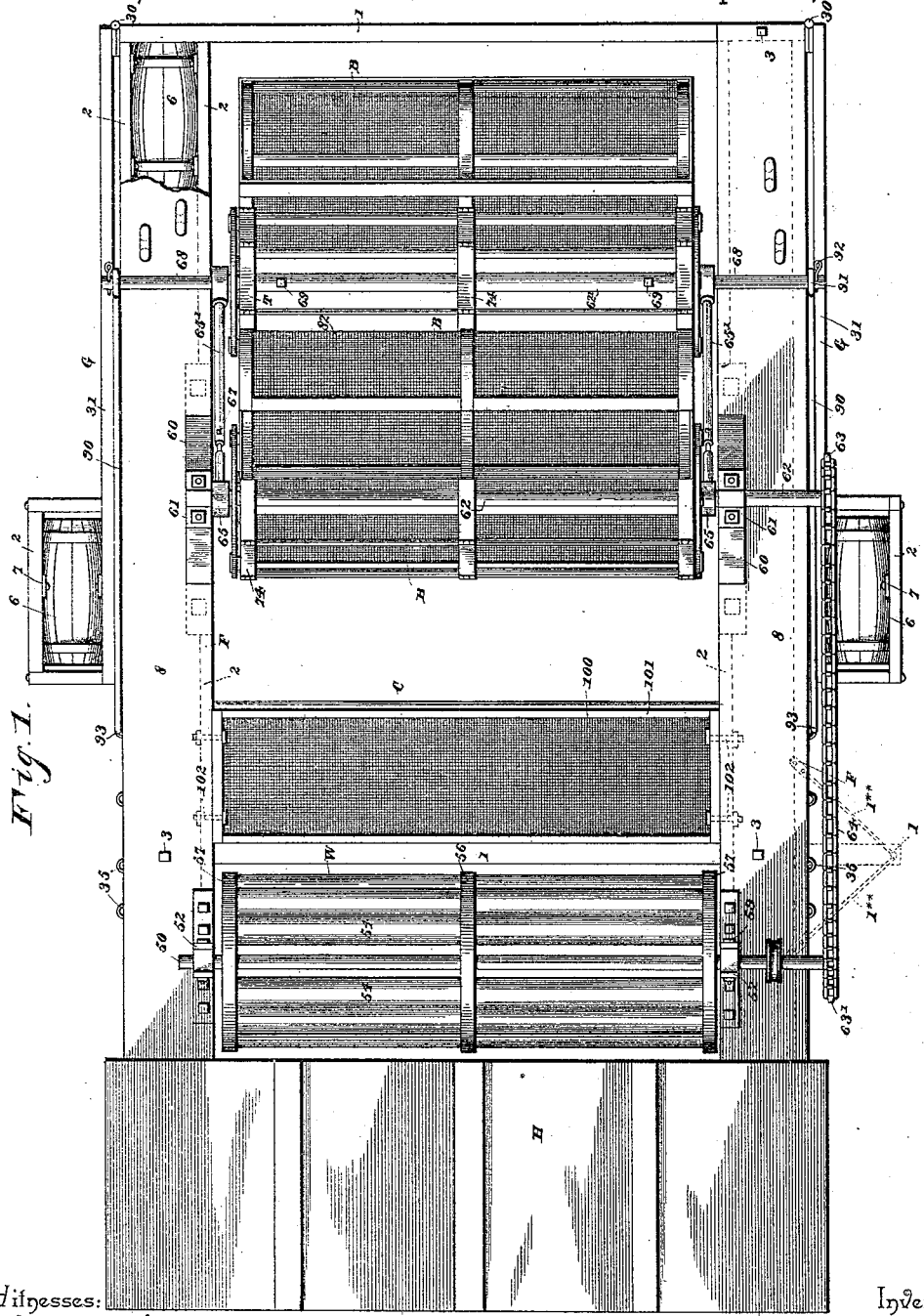
Witnesses:
J. M. Withrow
Inventor,
Robert Yoakum,
By his Attorneys,
N. L. Collamer.
C. A. Snow & Co.

(No Model.) 6 Sheets—Sheet 2.
R. YOAKUM.
FISH HARVESTER.
No. 450,306. Patented Apr. 14, 1891.
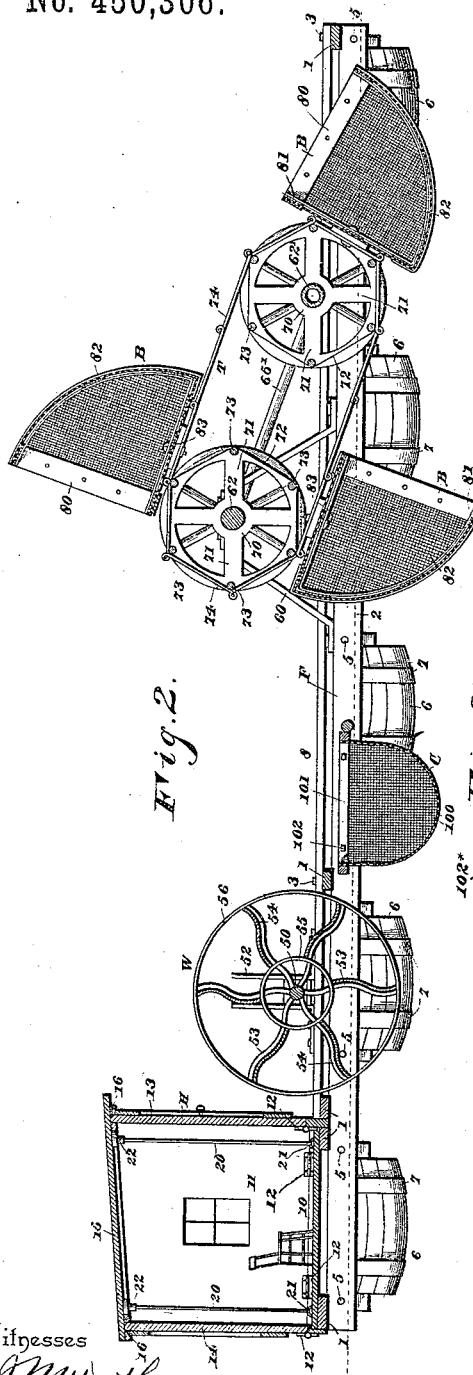
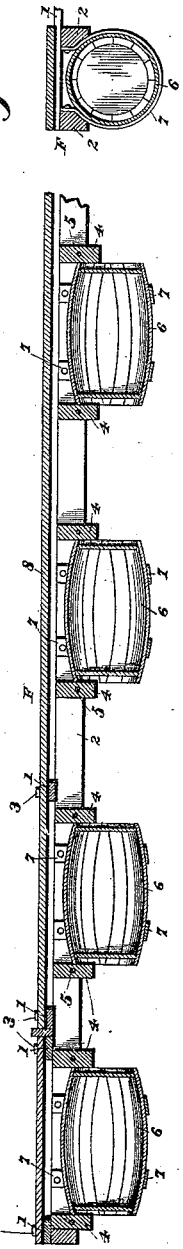
Witnesses
Inventor,
Robert Yoakum,
By his Attorneys, (No Model.)

R. YOAKUM.
FISH HARVESTER.

No. 450,306.

6 Sheets—Sheet 3.

Patented Apr. 14, 1891.

Witnesses:

Inventor
Robert Yoakum,
By his Attorneys,

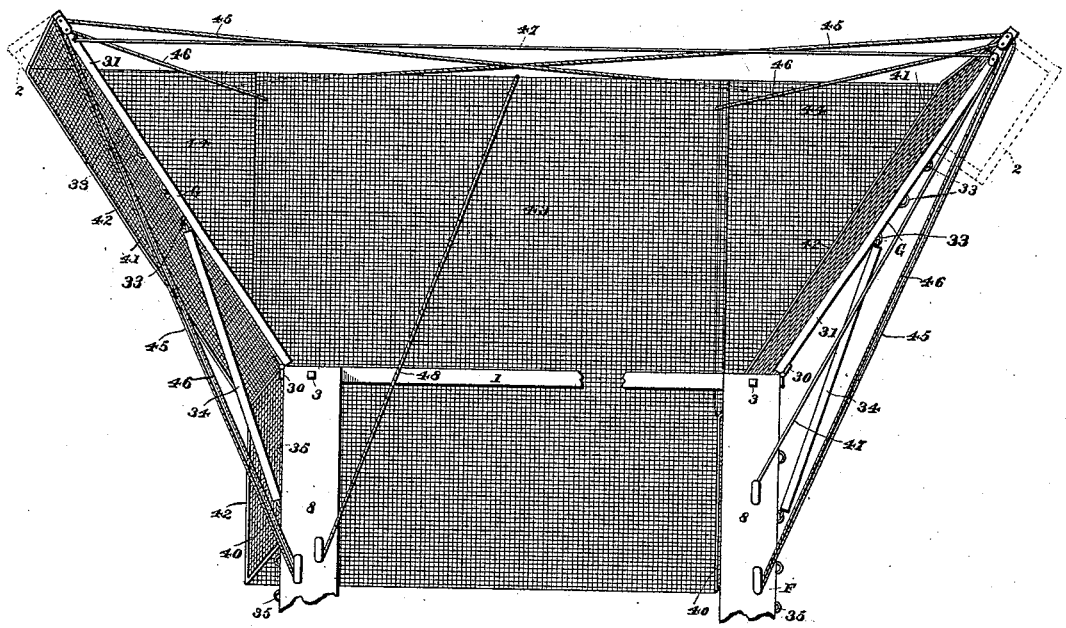
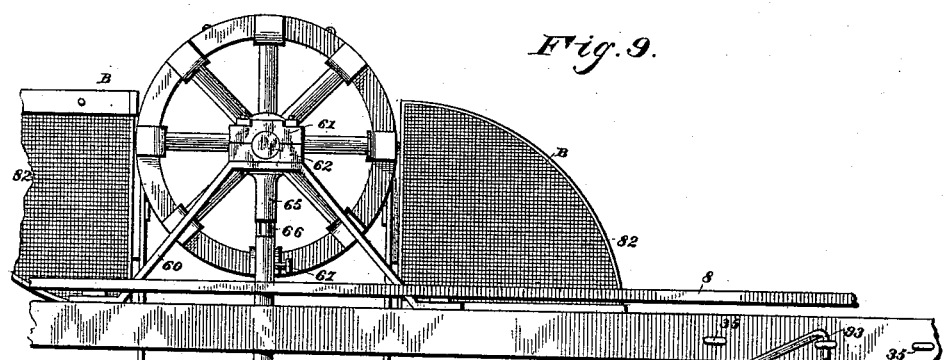

(No Model.) 6 Sheets—Sheet 5.
R. YOAKUM.
FISH HARVESTER.
No. 450,306. Patented Apr. 14, 1891.
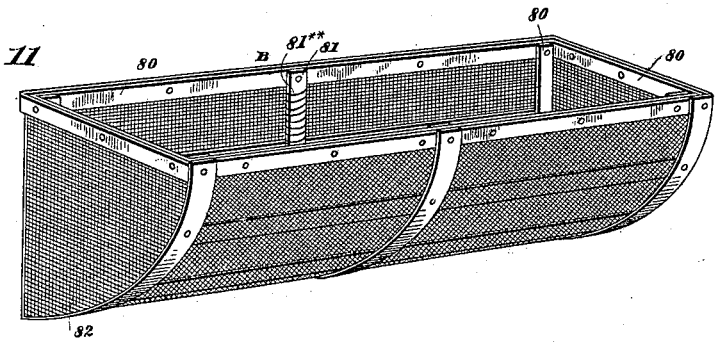
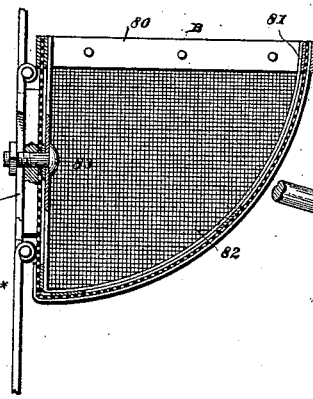
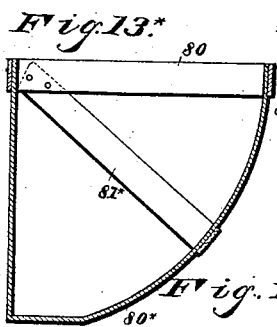
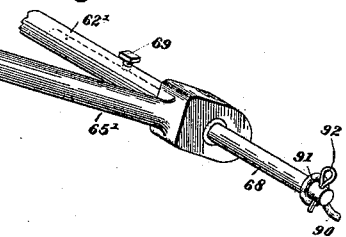
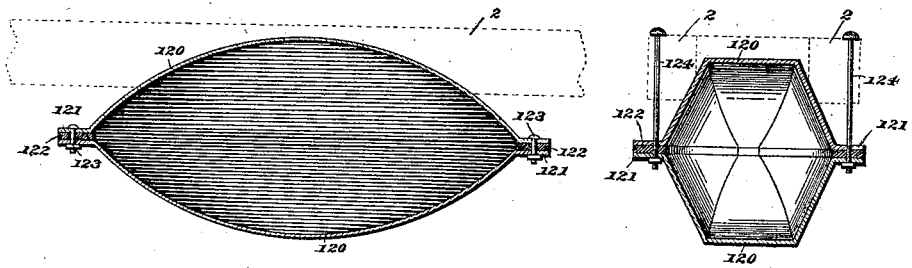
Witnesses:
Inventor
Robert Yoakum
By his Attorneys, (No Model.)  
6 Sheets—Sheet 6.

R. YOAKUM.  
FISH HARVESTER.

No. 450,306.  
Patented Apr. 14, 1891.

Witnesses:  
Inventor  
Robert Yoakum,  
By his Attorneys,

UNITED STATES PATENT OFFICE.

ROBERT YOAKUM, OF DALLAS, TEXAS, ASSIGNOR OF ONE-HALF TO ALLEN G. HALL, OF SAME PLACE.

FISH-HARVESTER.

SPECIFICATION forming part of Letters Patent No. 450,306, dated April 14, 1891.

Application filed May 14, 1890. Serial No. 351,821. (No model.)

*To all whom it may concern:*

Be it known that I, ROBERT YOAKUM, a citizen of the United States, residing at Dallas, in the county of Dallas and State of Texas, have invented a new and useful Fish-Harvester, of which the following is a specification.

This invention relates to machines for catching fish.

The object of the invention is to provide a floating device adapted to be anchored in a stream or other body of water and carrying the mechanism for taking fish from the water and delivering them to a suitable point on the shore, the whole operating either by steam, by wind, or by the current of the water.

The invention consists, broadly speaking, of a floating frame-work having floating guides forward of its open front end, a traveling belt carrying buckets which dip into the water within said frame-work and deliver the fish into a crate carried by the frame-work within the water, an engine, a windmill or (preferably) a water-wheel for communicating motion in said traveling belt, a trough leading from said crate to a suitable point on the bank of the stream, an elevator moving in said trough and driven by the one source of power, and a knockdown house at the rear end of the frame-work, as well as of certain specific details of construction of the parts named and other adjunctive elements and auxiliaries tending to enhance the mechanical value and completeness of the whole, all as hereinafter more fully described, and as illustrated in the accompanying drawings, in which—

Figure 5:
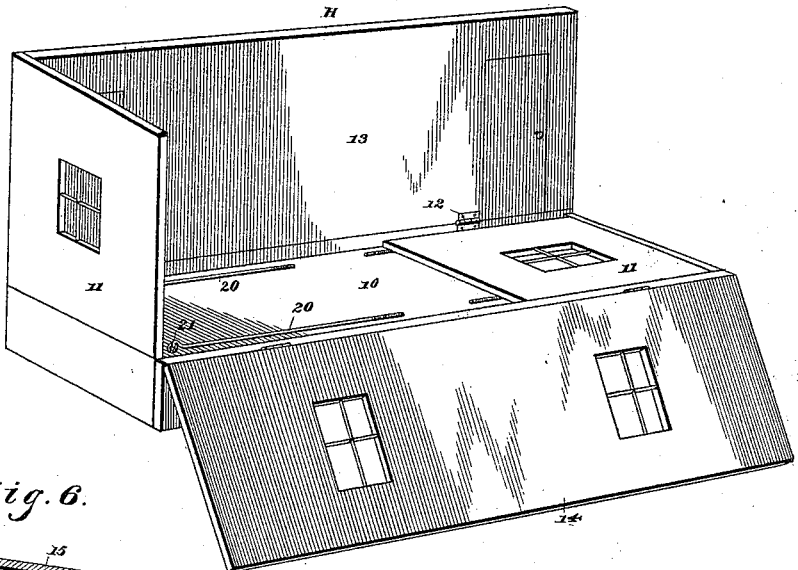
Figure 6:
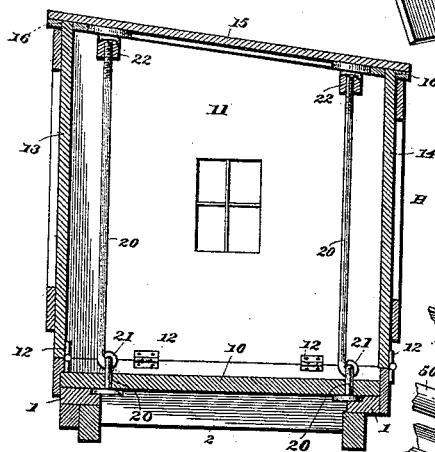
Figure 7:
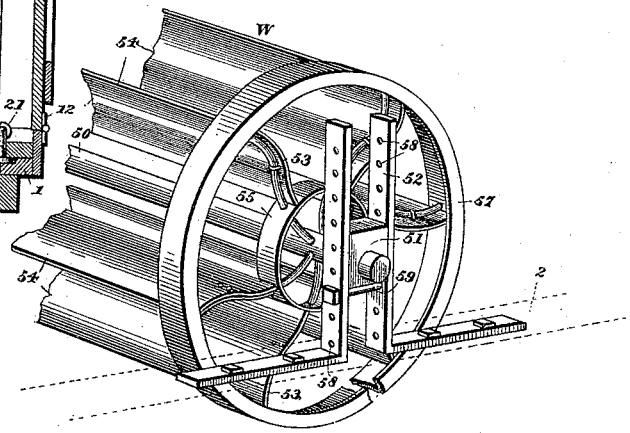
Figure 14:
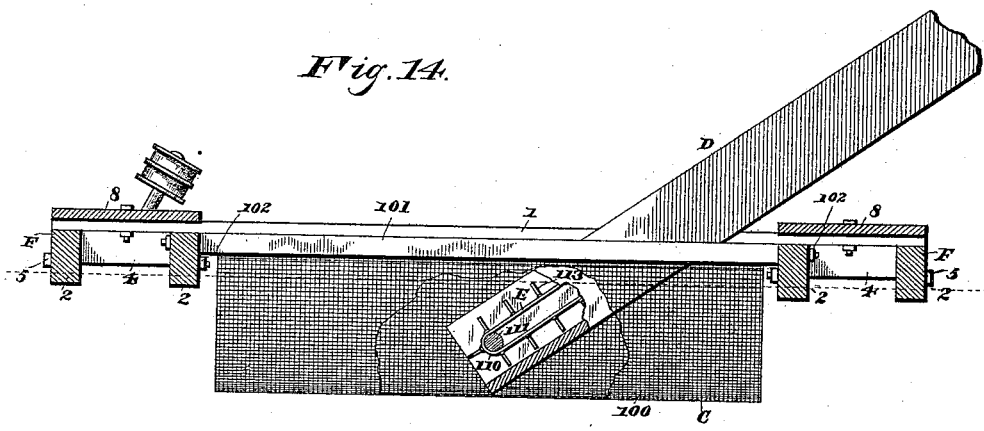
Figure 15:
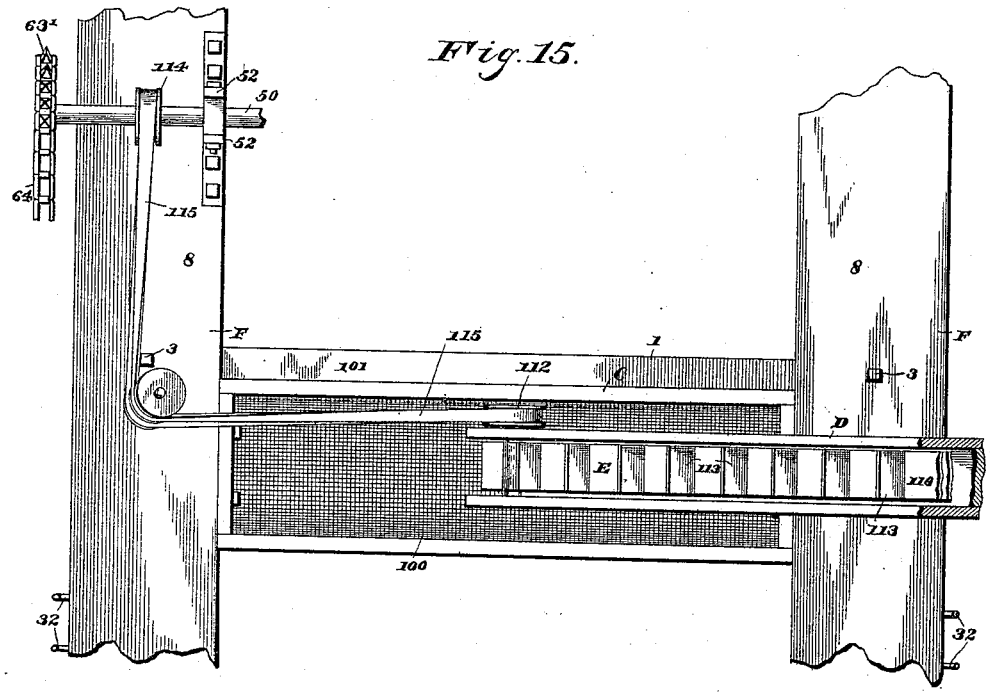

Figure 1 is a plan view of this device complete in its preferred form and ready for navigation. Fig. 2 is a central vertical longitudinal section of the same. Fig. $2^\times$ is a section through the crate-frame in its preferred form. Fig. 3 is a similar section of one of the side bars of the floating frame-work. Fig. 4 is a cross-section of Fig. 3 through one of the barrels. Fig. 5 is a perspective view of the house, showing the roof removed and the rear side and one end in abnormal position. Fig. 6 is an enlarged sectional view of the manner of securing the roof of the house in place. Fig. 7 is a perspective view of one end of the paddle-wheel, showing one of the adjustable supports for the bearings for the axles thereof. Fig. 8 is a plan in partial perspective, showing the manner of arranging the guides and the floor for the mouth of the machine. Fig. 9 is an end view of the two drums. Fig. 10 is an enlarged perspective view of the lower shaft and the socket and rod connected thereto. Fig. 11 is an enlarged perspective view of one of the buckets. Fig. 12 is a plan view of a section of one of the chains, showing one of the slotted links. Fig. $12^\times$ is a perspective view of the preferred means I employ for connecting the links. Fig. 13 is a cross-section through a bucket, showing its manner of connection with the slotted link. Fig. $13^\times$ is a section of the preferred form of bucket-frame. Fig. 14 is a side elevation of the crate and delivery-trough, showing them partly broken away to illustrate the form of endless belt and blades used therein. Fig. 15 is a plan view of the same, showing the manner of driving the endless belt from the shaft of the paddle-wheel. Fig. 16 is a central vertical longitudinal section of the form of barrel I prefer to use, showing the sills of the frame-work in dotted lines. Fig. 17 is a cross-section of the same.

Referring to the said drawings, the letter F designates the floating frame-work; G, the guides; T, the traveling belt having buckets B; C, the crate; W, the water-wheel; D, the delivery-trough; E, the elevator therein, and H the house for the operators, all as will be now more particularly described.

The frame-work F comprises two side pieces, preferably about thirty feet long, so spaced that they shall stand parallel with each other, leaving an opening in the clear of about ten feet between them, and held in this position by cross-timbers 1, laid at right angles to the side pieces or sills 2 and on top of the same and firmly secured by bolts 3. Each side piece of the frame comprises two sills 2, spaced about seventeen inches apart, and retained in this position by blocks 4, suitably located and connected thereto by bolts 5. The inner lower corners of the sills 2 are cut out at proper points, as shown in Fig. 4, and within these cut-away portions are seated barrels 6, which are of such a size that they cannot pass upwardly between the sills and are of such length that their ends abut against the blocks 4, and these barrels are held in place by metallic straps 7, preferably of hoop-iron, which pass underneath the smaller end of each barrel and are firmly secured at their upper ends to the two sills after having been tightly drawn around the barrel. The latter are preferably stout oak iron-bound barrels which have been formerly used for oil, and are therefore water-proof, and I find that about five to each side piece of thirty feet in length will be sufficient to sustain the weight of the floating frame-work and all the mechanism and operators thereon. Practical experiment has demonstrated the fact that a frame-work of this character is easily and cheaply constructed and will answer every requirement, and if one or two or even more of the barrels become broken or punctured (which will not be likely to occur) the floating capacity of those barrels remaining will be adequate and sufficient.

Upon the ends of the cross-timbers 1 and over the spaces between the sills 2, along each side of the frame-work F, and also at suitable points across the frame-work, if desired, I construct a plank walk 8, whereon the operators may pass around the mechanism while it is in motion to inspect the same, to oil the parts, to see that nothing is out of order, and to do whatever work is required of them.

Mounted upon the two rearmost cross-timbers 1 is a flooring 10 of the house H, which I preferably construct at this point in a cheap and light but substantial manner. This house is preferably of the knockdown character, in order that in case of sudden winds, storms, or freshets it may be folded, so that the elements will have little or no effect upon it, or the complete machine can be moved from place to place, as is found necessary. The ends 11 fold inwardly upon their hinges 12 and lie upon the flooring 10. The front side 13 folds inwardly upon its hinges 12 and lies upon the ends. The rear side 14 folds outwardly, as shown, and the top or roof 15 is bodily removable.

Suitable doors and windows are provided for the admission of light and the use of the operators, and other portable but essential elements and requisites of comfort may be provided, as occasion and necessity require.

The roof 15 has grooves 16 in its lower face, which engage the upper edges of the ends and sides, and bolts 20 are swiveled through the floor 10, linked, as at 21, and screwed at their upper ends into sockets 22, which are secured to the lower face of the roof at points just inside the four angles in said groove, all as shown in Fig. 6. When it is desired to fold the house, the bolts 20 are unscrewed from the sockets 22 in the roof and then turned upon their joints or links 21 and laid upon the floor 10, after which the ends and sides are folded as above described.

At the front corners of the frame-work F, by hinges 30, are connected the guides G, each of which comprises a like bar 31, having at its outer end a barrel 6, supported beneath a short piece of sill 2 by metallic straps 7, the same as the side pieces of the frame-work above described. When in folded position these guides are connected to the outer sides of the frame-work by hooks 32, which engage staples 33 in the guides, and when in distended position the guides are braced by braces 34, having hooks in their ends, which engage staples 35 in the frame-work and one of the staples 33 in the guides. By this means the latter may be set at any desired angle to the body of the frame-work, or may be folded against the sides thereof when the machine is not in use.

Depending from the side pieces of the frame-work are vertical curtains 40, preferably of coarse wire-cloth, and depending from the bars 31 of the guides are similar curtains 41, all of which curtains hang in the water a sufficient depth and may be provided with wire frames 42 for stiffening them, as will be understood, and which will also hold the curtains in the proper position within the water. The curtains on the guides thus form a wide mouth to this machine, and the bottom of this mouth is composed of a central rectangular section 43, of the same width as the frame-work, and two triangular sections 44, one connected to each curtain 41 at its lower edge, all as shown in Fig. 8. Chains or ropes 45 lead from the inner corners of each triangular piece 44 past each other, over pulleys or blocks at the outer ends of the opposite guides G, and back to the frame-work, and by drawing upon these ropes the side pieces of the bottom can be drawn inwardly toward each other and held in proper position. Other chains or ropes 46 extend from either front corner of the bottom section 43, lead over similar pulleys at the outer ends of the guides, and also extend rearwardly to the frame-work, and by drawing upon these ropes the bottom section 43 may be made tight and held in proper position, as will be understood. A tie-wire 47 connects the front ends of the two guides to prevent their spreading by the force of the current against the curtains 42 and the bottom of the mouth, and this tie-wire may be fastened to one guide, led over a pulley in the other, and then connected to the frame. By slackening the last-mentioned wire 47 the front ends of the guides will be permitted to swing around against the sides of the frame, and the curtains 42 and side bottom sections 44 can then be drawn on board, the central bottom section 43 being drawn up onto the front end of the frame-work by a rope 48. A frame-work as thus constructed may be anchored in a stream with the mouth open toward the direction in which the fish are running, and the current of the stream may be utilized to turn a water-wheel carried by the frame, which will drive the operative mechanism of the machine; or a sail may be rigged upon the frame F, which will move the whole upon the surface of a bay or lake, and this movement through the water will cause the rotation of the water-wheel, which may be utilized in the same way; or by slightly increasing the number of barrels on the sides of the frame or the size of the latter a small engine may be mounted thereon, which will drive such mechanism.

The paddle-wheel I preferably use is best illustrated in Fig. 7. This wheel W comprises a shaft 50, journaled in bearings 51, adjustable in a support 52, carried upon the sills 2, and projecting radially from this shaft at each end thereof are six bent spokes 53, to which are secured the blades 54, the latter being bent on an ogee curve in order to give more bearing-surface for the water. A hoop of iron 55 surrounds the shaft 50 at its center and at each end inside the blades and is provided with holes through which the spokes project, and the inner edges of the blades are secured to this hoop. A similar hoop 56 surrounds the outer edges of the blades at the center of their length, and outer hoops 57 of L-shape cross-section surround them at their ends, all of the hoops being securely fastened thereto. The said support 52 for the bearings 51 of the shaft 50 comprises a pair of arms carried upon the sills 2, projecting upwardly from the same and provided with a number of holes 58, and through a pair of these holes is inserted a transverse bolt 59, upon which the bearings 51 rest. It will thus be understood that when the bearings are lowered in the supports 52 so that they rest upon the sills 2 the blades upon the lower side of the paddle-wheel will sink deep into the water; but when such bearings are raised within the supports the blades will be partially or wholly withdrawn from the water, whereby the speed of rotation of the wheel W may be diminished, as when the current is strong, or stopped entirely, as when it is desired to stop the running of the machine, or in case of freshets, when the water is covered with débris and floating logs. It will be understood that the blades of the wheel are connected with the shaft and with the several hoops by bolts, whereby when it is desired to have the device stand in the stream with its mouth downstream the said blades may be detached from their spokes and turned end for end upon the shaft, so as to receive the water from a current running in an opposite direction to that illustrated.

Rising about five feet from the inner sills of each side piece of the frame is a standard 60, having a bearing 61 at its upper end, and in this bearing is journaled a shaft 62, having a sprocket-wheel or smooth pulley 63 on one extremity, which may be connected by a chain or belt 64 with a sprocket-wheel or smooth pulley 63' on the shaft of the paddle-wheel above described.

Turning loosely on the shaft 62, just inside the bearings 61, is a socket 65, which is extended in a rod 66. A second socket 65', somewhat longer than the first, is provided, into the open end of which the rod 66 is adapted to pass, and a set-screw 67 near the open end of this socket holds the rod at any desired adjustment therein.

Between the free ends of the sockets 65' is located a tubular shaft 62', and passing into the ends of this shaft are rods 68, which are retained in position by set-screws 69, similar to those mentioned above. It will thus be seen that the lower shaft 62' is journaled in the free ends of the sockets 65', and that it can be adjusted with relation to the shaft 62 to tighten a belt (hereinafter described) which surrounds these shafts. It will also be seen that when the set-screws 69 are removed and the rods 68 slipped out of or into the free ends of the sockets 65 the shaft 62' will be disengaged from its bearings and can be raised or lowered, as desired. The rods 68 stand normally above the sills 2, across which they extend; but when the shaft 62' is disengaged therefrom and lowered between the two innermost sills these rods are afterward reinserted through the eyes in the free ends of the socket and into the ends of the tubular shaft and the set-screws 69 tightened up to hold the parts in place.

Upon the shafts are hubs 70, having radiating spokes 71 and polygonal rims 72 and connected by rods 73, whereby hollow drums about four feet in diameter are formed around each shaft, and running over these drums are endless chains, whose links 74 are of the same length as the distance between the rods 73. These links are detachably hinged together at their ends, and one in about every eight is provided with a slot 75 in its body. By lengthening the distance between the two sockets, and hence between the two drums, a greater length of chains will be required, and this can be supplied by adding extra links and extra buckets, as will be understood.

The letter B designates a bucket, the same comprising a metallic frame-work composed of strips of iron or steel 80, arranged in about the outline shown, with preferably a stamped steel hook 81 shaped to fit inside of each bucket midway between its ends to prevent its spreading at that point, and an exterior covering 82, of coarse wire-cloth one and one-half inch mesh, secured around said frame-work and hoop, sewed in with No. 18 or No. 19 wire. Bolts 83 pass through the rear bars of the frame-work of each bucket and take into the slots 75 in the links of the chain, and by this means the buckets are so attached thereto that their mouths will be nearly opposite the joints in the chain; but the lower portions thereof will extend slightly beyond the next joints in rear thereof, as shown in the drawings.

With the above construction of drums and traveling belt when it is desired to lower the forward and lowermost drum into the water the rods 68 are passed beneath the sills 2 and secured in the ends of the tubular shaft 62'. Braces 90 are provided, having eyes 91 in their front ends, which are engaged over the outer ends of the rods 68 and held in engagement therewith by pins 92 passing through said rods, and the other ends of these braces 90 are provided with hooks 93, which are engaged in one of staples 35 in the sides of the sills 2. By this means the lower drum can be adjusted higher or lower beneath the surface of the water and at any angle, as will be readily understood.

The letter C designates a crate, preferably made of wire-cloth 100, supported by a suitable frame-work 101, which is sustained by bolts 102 passing from the frame-work 101 through the sills 2, and this crate is preferably located between the traveling belt T and the paddle-wheel W and at such a position relatively to the shaft 62 that the buckets B as they pass over the upper drums will deliver their contents into the crate. It will be understood that the latter is suspended so that the water stands therein, and the fish caught by the machine will be cared for in their natural element.

The letter D designates a trough, which may be employed, as shown in Figs. 14 and 15, its lower end being seated in the crate C, and its upper end led to a suitable point either on board a ship or boat which may be standing alongside this machine or on shore, as a canning-factory. When the trough here shown is used, an endless belt 110 therein passes over rollers 111 at its upper and lower ends, the lower roller being provided with a sprocket-wheel or a grooved wheel 112, which may be connected by a chain or band 115 with a wheel 114 upon the shaft 50 of the driving mechanism, as and for a purpose understood. Upon the belt 110 are secured blades 113, of a size to fit the interior of the trough, and when the rollers 111 are revolved these blades are carried up the trough, and the fish will be thereby delivered at the desired point. This trough and the elevator E therein will be stored within the house H or at some convenient point upon the frame-work F when not in use, and the machine may be operated to catch fish and deliver them into the crate C, the latter being of a size to accommodate a large number. A belt and buckets similar to those lettered T and B may be used instead of the trough D, if preferred.

In Figs. 16 and 17 I have illustrated in section the preferred form of barrel which I employ in constructing and supporting the frame-work F, which may be octagonal or hexagonal, but is preferably round in cross-section, although it will be understood that wooden barrels, as above described, answer all the requirements, except that they are more easily broken. In this preferred form the barrel is made in two halves 120, each stamped from a single sheet of steel, with lips or flanges 121 surrounding its edges. The flanges on the two halves are separated by a rubber or other packing 122, and bolts or rivets 123 pass through the flanges and the packing and hold the parts properly assembled. It will be understood that when these metallic barrels or floats are used in the construction of the frame-work F the bands 7 may be dispensed with and bolts 124 may be passed through the flanges 121, whereby these metallic floats may be connected to the lower edges of the sills 2.

From the above description and from the accompanying illustrations it is thought the operation of this device will be obvious. It possesses great advantages in its cheapness of manufacture, durability of construction, efficiency of operation, and comfort for the operator. It will be understood, of course, that parts of this machine may be used independently without affecting the merits of the invention.

In Fig. $2^\times$ I have illustrated a section of the crate-frame in its preferred form. In this construction bars $101^\times$ extend transversely around the bottom of the crate and have hooks $102^\times$ detachably seated over cross-rods $1^\times$, similar to the cross-beams 1, the several transverse bars being connected by longitudinal strips about as shown and the netting 100 secured within or around the frame, as will be understood.

In Fig. $12^\times$ I have illustrated my preferred form of traveling belt T and the means for connecting the ends of the links 74 thereof. In this instance plates $75^\times$ are located opposite the adjacent ends of the links, and bolts $74^\times$ pass through the plates and through eyes in the ends of the links, whereby the latter are flexibly connected or hinged together. The plates $75^\times$ stand on edge—that is, at right angles to the link 74—and in their lower edges they are provided with notches $75^{\times\times}$, which notches engage the rods 73 of the hollow drums hereinbefore described.

In Fig. $13^\times$ I have illustrated a section of the preferred form of bucket-frame which I use. In this construction the top, end, and back pieces of the bucket are straight, as shown; but the front member $80^\times$ is flat at the mouth of the bucket and at the bottom of the bucket, but curved between such points. At each end of the bucket I preferably employ a bracing-strip $81^\times$, which connects the upper rear corner of the frame with the front member $80^\times$ at about the center of its length, whereby the weight of the fish in the bucket will be better sustained. In some cases I prefer to employ wire $81^{\times\times}$, by means of which the netting 82 is sewed to the frame, as seen in Fig. 11, the strands of the wire passing round and round the bars of the frame and through the meshes of the netting.

At the bottom of Fig. 1 I have shown in dotted lines one of the cross-timbers 1 extended beyond the side piece of the frame-work F and connected at its outer end by diagonal brace-rods $1^{\times\times}$ with the outer sill 2. This is a construction which I preferably employ in certain instances to give the framework greater strength, as it prevents it from becoming knocked out of square by forcible contact with wharves or boats or under the strain of operating the machinery. It will be understood, of course, that several of the cross-timbers 1 are so extended and braced; but I have only shown one in the present instance to give an idea thereof. These preferred forms of construction have been demonstrated to be correct by a practical use of the machine, and while they may be mere mechanical variations and arrangements I have considered it advisable to illustrate and describe them in order that a complete machine of this character may be more easily constructed.

What I claim is—

1. The frame-work F, the sides of which comprise two sills 2, spaced by transverse blocks 4, the inner lower corners of the sills being cut away, barrels fitted in said cutaway portions between the sills and a pair of the blocks, and metallic straps 7, their ends secured to the sills and their bodies passing beneath the barrels, substantially as described.

2. In a fish-catching device, the combination, with the floating frame-work F, of the guides G, having barrels at their free ends, hinges 30 between their inner ends and the frame-work, staples 33 and 35 in the guides and in the frame-work, respectively, braces 34, having hooks in their ends engaging certain of said staples, and curtains depending from and supported by said guides and frame-work, substantially as described.

3. In a fish-catching device, the combination, with the floating frame-work F, of the floating guides G, hinges 30 between their inner ends and the frame-work, a tie-wire 47, connected to the free end of one guide, passing over a pulley at the free end of the other guide, and engaging the frame-work, and curtains depending from and supported by said guides and frame-work, substantially as described.

4. In a fish-catching device, the combination, with the frame-work F and the guides G, all floating upon the water, of vertical curtains 40 and 41, surrounded by frames 42 and supported by the sides of the frame-work and the guides, respectively, and a horizontal curtain connecting the lower edges of the vertical curtains at each side of the device, substantially as described.

5. In a fish-catching device, the combination, with the frame-work F and the guides G, all floating upon the water, of vertical curtains 40 below the sides of the frame-work, a horizontal curtain 43, connecting their lower edges and extending forward of their front ends, vertical curtains 41, supported by the guides, triangular curtain 44, connected to their lower edges and lapping the outer edges of said horizontal curtain forward of the frame-work, and devices, substantially as described, for supporting said curtains and adjusting their positions, as set forth.

6. In a fish-catching device, the combination, with the frame-work F and the guides G, all floating upon the water, of vertical curtains 40 below the sides of the frame-work, a horizontal curtain 43, connecting their lower edges and extending forward of their front ends, vertical curtains 41, supported by the guides, triangular curtains 44, connected to their lower edges and lapping the outer edges of said horizontal curtain forward of the frame-work, ropes 46, connected to the front corners of said horizontal curtain and leading outwardly, ropes 45, connected to the front corners of said triangular curtains and leading across each other, all said ropes passing over pulleys in the free ends of the guides and being connected to the frame-work, and a rope 48, leading directly from the front edge of said horizontal curtain to the frame-work, all as and for the purpose set forth.

7. The combination, with the floating frame-work F and fish-catching devices, substantially as described, carried thereby, of a paddle-wheel W, imparting motion to said fish-catching devices, and means, substantially as described, for adjusting the bearings of said wheel vertically, as and for the purpose set forth.

8. The combination, with the floating frame-work F and fish-catching devices carried thereby, of a paddle-wheel W, imparting motion to said devices, bearings 51 for the shaft 50 of said wheel, supports 52, provided with a number of opposite holes 58, and bolts 59, passing through a pair of said holes beneath said bearings, as and for the purpose set forth.

9. The combination, with the floating frame-work F and fish-catching devices carried thereby, of a paddle-wheel W, imparting motion to said devices, said wheel comprising a shaft 50, journaled in suitable bearings carried by the frame-work, spokes 53, blades 54, each of which is bent transversely on an ogee curve, hoops 55, surrounding the shaft, embracing the spokes, and connected to the inner edges of the blades, and outer hoops of L-shape cross-section surrounding and connected to the outer corners of the blades, substantially as described.

10. The combination, with the floating frame-work F and the motor W, carried thereby, of an endless chain T, passing over rollers supported by said frame-work, buckets B on said chain, a connection 64 between said motor and said rollers, and curtains carried by said frame-work, all substantially as and for the purpose set forth.

11. In a fish-catching device, the combination, with the floating frame-work F and guide-curtains, substantially as described, supported thereby, of the standards 60, having bearings 61, the rotating shaft 62, mounted therein, sockets 65, turning on said shaft, a second shaft 62', sockets 65', connected therewith, rods 66, secured in the upper sockets 65 and moving into and out of the lower sockets 65', set-screws 67 on the latter impinging against said rods, drums carried by said shafts, belts traveling around said drums, and buckets carried by said belts, all as set forth.

12. In a fish-catching device, the combination, with the floating frame-work F and the standards 60, having stationary bearings 61, of the rotating shaft 62, mounted in said bearings, sockets 65, turning on said shaft and having rods 66, a tubular shaft 62', having set-screws 69, extension-rods 68 in the ends of said tubular shaft engaged by the set-screws, sockets 65', engaging said extension-rods and having set-screws 67 impinging against said rods 66, drums carried by said shafts, belts traveling around said drums, and buckets on said belts, all as set forth.

13. In a fish-catching device, the combination, with the floating frame-work F, of the rotating shaft 62, journaled in fixed bearings thereon, the tubular shaft 62', means, substantially as described, for adjusting the distance between said shafts, drums on the latter, belts traveling around said drums, buckets thereon, braces 90, connected to the ends of said tubular shaft and having hooks 93 at their other ends, and staples 35 in the frame-work, with which said hooks engage, as and for the purpose set forth.

14. In a fish-catching device, the combination, with the floating frame-work F, of the rotating shaft 62, journaled in fixed bearings thereon, the tubular shaft 62', means, substantially as described, for adjusting the distance between said shafts, drums on the latter, belts traveling around said drums, buckets thereon, extension-rods 68 in the ends of said tubular shaft, set-screws 69 in the latter impinging against said rods, braces 90, having eyes 91 engaging the outer ends of said rods outside of said frame-work, the other ends of said braces being adjustably connected to the sides of the frame-work, and pins 92, holding the eyes on the rods, all as and for the purpose set forth.

15. In a fish-catching device, the combination, with the floating frame-work F, the stationary bearings 61, supported thereby, the rotating shaft 62, mounted in said bearings, the tubular shaft 62', and means, substantially as described, for adjusting the distance between said shafts, of spokes 71 and polygonal rims 72, carried by said shafts, rods 73, connecting the angles in said rims, endless chains passing around all said rods, certain of the links 74 of said chains having slots 75 and all of said links being detachably connected at their ends, buckets B, comprising metallic frame-work 80, covered with wire-cloth 82, and bolts 83, passing through said frame-work and engaging said slots 75, the whole operating as set forth.

16. In a fish-catching machine, the combination, with the floating frame-work F and the traveling belt T, having buckets B, of a crate C, submerged in the water, said crate comprising a frame-work 101$^\times$, covered with wire-cloth 100 and having hooks 102$^\times$ connecting the frame-work 101$^\times$ with transverse rods 1$^\times$, extending across the frame-work F of the machine, substantially as described.

17. In a fish-catching machine, the combination, with the floating frame-work F, the traveling belt T, having buckets B, and the crate C, supported by said frame-work, of a trough D, its lower end seated in said crate and its upper end led to a suitable point for delivery of the fish, said trough containing end rollers 111, an endless belt 110, passing over said rollers, its lower side moving upwardly in the trough, and blades 113, carried by said belt and loosely fitting the bottom of the trough, as set forth.

18. In a fish-catching machine, the combination, with the floating frame-work F, fish-catching devices, substantially as described, supported thereby, and the crate C, also carried by the frame-work, of a trough D, its lower end seated in said crate, an elevator E within said trough, a wheel 112, connected to said elevator, and a band 115, connecting said wheel with a drive-wheel 114 on a shaft 50, connected with said catching devices, as set forth.

19. The combination, with the sills 2 of the frame-work F, of metallic barrels comprising two halves 120, having flanges 121 around their edges, water-tight packing 122 between said flanges, bolts 123, passing through said flanges and packing, and supporting-bolts 124, passing through said flanges and packing and also through said sills, substantially as described.

20. A fish-catching machine comprising a floating frame-work F, floating guides G, connected thereto, aprons carried by said frame-work and guides, a knockdown house H at the other end of the frame-work, a paddle-wheel W, a traveling belt T, driven from said paddle-wheel and having buckets B, a crate C, into which said buckets deliver the fish, a delivery-trough D, leading from said crate, and an elevator E in said trough driven from said paddle-wheel, all constructed and operating substantially as described.

21. A fish-catching machine comprising a floating frame-work F, floating guides G, connected thereto, aprons carried by said frame-work and guides, a paddle-wheel W, a traveling belt T, driven from said paddle-wheel and having buckets B, a crate C, into which said buckets deliver the fish, a delivery-trough D, leading from said crate, and an elevator E in said trough driven from said paddle-wheel, all constructed and operating substantially as described.

22. A fish-catching machine comprising a floating frame-work F, floating guides G, connected thereto, aprons carried by said frame-work and guides, a paddle-wheel W, a traveling belt T, driven from said paddle-wheel and having buckets B, and a crate C, into which said buckets deliver the fish, all constructed and operating substantially as described.

23. A fish-catching machine comprising a floating frame-work F, a paddle-wheel W, a traveling belt T, driven from said paddle-wheel and having buckets B, and a crate C, into which said buckets deliver the fish, all constructed and operating substantially as described.

24. A fish-catching machine comprising a floating frame-work F, floating guides connected thereto, aprons carried by said frame-work and guides, a paddle-wheel W, having reversible blades, a traveling belt T, driven from said paddle-wheel and having buckets B, and a crate into which said buckets deliver the fish, all substantially as described.

25. A fish-catching machine comprising a floating frame-work F, floating guides G, hinged thereto, braces for adjusting the position of said guides, aprons carried by said frame-work and guides, a paddle-wheel W, mounted in vertically-adjustable bearings, a traveling belt T, passing over an upper fixed drum and a lower adjustable drum, buckets B on said belt, and a crate C, detachably bolted to said frame-work, the whole constructed substantially as described and adapted to be changed in its parts according to the strength of the current.

26. In a fish-catching machine, the combination, with the floating frame-work F, of the floating guides G, connected thereto, vertical aprons depending from said frame-work and guides, horizontal aprons connected to the lower edges of said vertical aprons, means, substantially as described, for adjusting the positions of said guides and all said aprons, and fish-catching devices, substantially as described, mounted upon said frame-work in rear of said aprons, as set forth.

27. In a fish-catching device, the combination, with the floating frame-work F and fish-catching devices, substantially as described, connected therewith, of a motor mounted upon said frame-work and operating said devices, as set forth.

In testimony that I claim the foregoing as my own I have hereto affixed my signature in presence of two witnesses.

ROBERT YOAKUM.

Witnesses:
CLIFTON SCOTT,
JOHN WILLIAMS.